(12) United States Patent
Kurk et al.

(10) Patent No.: US 11,139,683 B2
(45) Date of Patent: Oct. 5, 2021

(54) SYSTEMS AND METHODS FOR HIGH EFFICIENCY POWER CONVERSION

(71) Applicant: CommScope Technologies LLC, Hickory, NC (US)

(72) Inventors: Morgan C. Kurk, Denver, NC (US); John Charles Chamberlain, Hickory, NC (US); Kevin E. Linehan, Rowlett, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/091,082

(22) Filed: Nov. 6, 2020

(65) Prior Publication Data

US 2021/0057932 A1    Feb. 25, 2021

Related U.S. Application Data

(63) Continuation of application No. 16/340,673, filed as application No. PCT/US2017/055326 on Oct. 5, 2017, now Pat. No. 10,833,529.

(Continued)

(51) Int. Cl.
*H02J 9/06* (2006.01)
*H02J 7/34* (2006.01)

(52) U.S. Cl.
CPC ............ *H02J 9/062* (2013.01); *H02J 7/34* (2013.01); *H02J 9/061* (2013.01); *Y02B 10/70* (2013.01)

(58) Field of Classification Search
CPC ................................. H02J 9/062; H02J 9/061

(Continued)

(56) References Cited

U.S. PATENT DOCUMENTS

2007/0229044 A1    10/2007  Visairo-Cruz et al.
2009/0076661 A1*   3/2009  Pearson ................... H02J 7/34
                                                      700/291

(Continued)

FOREIGN PATENT DOCUMENTS

WO         0101553 A1     1/2001
WO      2009015331 A1     1/2009

OTHER PUBLICATIONS

European Patent Office, "Communication pursuant to Article 94(3) EPC from EP Application No. 17860079.7", from Foreign Counterpart to U.S. Appl. No. 16/340,673, filed Feb. 18, 2021, pp. 1 through 5, Published: EP.

(Continued)

*Primary Examiner* — Tomi Skibinski
(74) *Attorney, Agent, or Firm* — Fogg & Powers LLC

(57) ABSTRACT

Systems and methods for high efficiency power conversion are provided. In one embodiment, a high efficiency electric power converter circuit comprises: an electric power converter that provides a first electric power output; a storage device that provides a second electric power output; and a power arbitrating switch that receives the first and second electric power outputs and selectively supplies a third electric power output using at least one of the first electric power output and the second electric power output. The switch is configured with a first sensor to measure a charge level of the device and with a second sensor to measure a power demand drawn from the third electric power output. The power arbitrating switch switches the third electric power output between being supplied from the first electric power output and being supplied from the second electric power output based on the power demand and the charge level.

14 Claims, 4 Drawing Sheets

Related U.S. Application Data

(60) Provisional application No. 62/406,890, filed on Oct. 11, 2016.

(58) Field of Classification Search
USPC .......................................................... 307/66
See application file for complete search history.

(56) References Cited

U.S. PATENT DOCUMENTS

| | | |
|---|---|---|
| 2009/0100275 A1 | 4/2009 | Chang et al. |
| 2009/0152953 A1 | 6/2009 | Dong et al. |
| 2009/0236916 A1 | 9/2009 | Nishimura |
| 2011/0291479 A1 | 12/2011 | Lee |
| 2013/0279226 A1 | 10/2013 | Ofek |
| 2016/0190865 A1 | 6/2016 | Shin et al. |
| 2019/0237996 A1 | 8/2019 | Kurk et al. |

OTHER PUBLICATIONS

European Patent Office, "Extended European Search Report from EP Application No. 17860079.7", from Foreign Counterpart to U.S. Appl. No. 16/340,673, filed Mar. 3, 2020, pp. 1-8, Published: EP.
International Searching Authority, "International Search Report and Written Opinion from PCT Application No. PCT/US2017/055326 dated Jan. 24, 2018", dated Jan. 24, 2018, pp. 1-15, Published: WO.
U.S. Patent and Trademark Office, "Notice of Allowance", U.S. Appl. No. 16/340,673, filed Aug. 11, 2020, pp. 1 through 9, Published: US.
U.S. Patent and Trademark Office, "Office Action", U.S. Appl. No. 16/340,673, filed Jul. 13, 2020, pp. 1 through 25, Published: US.

\* cited by examiner

SYSTEMS AND METHODS FOR HIGH EFFICIENCY POWER CONVERSION

CROSS-REFERENCE TO RELATED APPLICATIONS

This Application is a Continuation Patent Application of U.S. patent application Ser. No. 16/340,673, titled SYSTEMS AND METHODS FOR HIGH EFFICIENCY POWER CONVERSION" filed on Apr. 9, 2019, which claims priority to, and the benefit of, 371 U.S. National Stage Patent Application of International Application PCT/US2017/055326, titled "SYSTEMS AND METHODS FOR HIGH EFFICIENCY POWER CONVERSION" filed on Oct. 5, 2017, which claims priority to, and the benefit of, U.S. Provisional Patent Application No. 62/406,890, filed on Oct. 11, 2016 and titled "SYSTEMS AND METHODS FOR HIGH EFFICIENCY POWER CONVERSION" which is incorporated herein by reference in its entirety.

BACKGROUND

Electric power converters, such as DC-to-DC converters, AC-to-AC converters, or AC-to-DC rectifiers, are common elements found in the power supply circuitry of many electronics devices. Once issue, however, with such electric power converter elements is that their conversion efficiency varies as a function of their load demand. An electric power converter operates more efficiently when supplying a heavy load demand, and less efficiently when supplying a lighter load demand. Circuit designers therefor face a challenge in how to size a power converter to feed a circuit that has a load demand that varies over time. For example, if the power converter is designed with a peak capacity matched to the circuit's peak load demand, then on average the power converter will itself be running at less than its peak efficiency. As a result, a greater percentage of the electrical power supplied to the power converter will be transformed to thermal energy (i.e. heat) rather than energy for powering electronics. Moreover, that thermal energy will contribute to heat accumulation in the device housing. Accordingly, the housing would need to be designed to keep the electronics device from overheating. Given industry's increasing expectations for energy efficient electronic devices, efficient operation of an electric power converter within an electronic device is one way to increase the overall efficiency of the electronic device.

For the reasons stated above and for other reasons stated below which will become apparent to those skilled in the art upon reading and understanding the specification, there is a need in the art for systems and methods for high efficiency power conversion.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the efficiency characteristics of electric power converters by introducing an arbitrating switch between the electric power converters and a connected load to which they supply power, along with integration of an electrical energy storage device. More specifically, the arbitrating switch senses when the electric power converter is operating at less than full capacity, and thus operating at less than peak efficiency. When the electric power converter is operating at less than full capacity, the power arbitrating switch raises the demand on the electric power converter so that it is operating at, or near, peak efficiency by using any excess capacity of the electric power converter to charge the electrical energy storage device. In one embodiment, when the electrical energy storage device becomes sufficiently charged to power the connected load, the electrical energy storage device takes over powering the connected load. As such, whenever the electric power converter is supplying power through the arbitrating switch, it is doing so at its full capacity and thus at or near peak efficiency. Otherwise, the electric power converter is simply off with the electrical energy storage device providing power to the connected load. In some embodiments, when the electric power converter is already supplying power through the power arbitrating switch at full capacity, and a momentary additional power demand is placed on the electric power converter, the overall demand can be supplied for that time duration by the combination of the electric power converter and the electrical energy storage device. When the charge of the electrical energy storage device drops below a predeterminate threshold, the power arbitrating switch reverts to powering the connected load via the electric power converter while using any marginal capacity of the electric power converter to recharge the electrical energy storage device.

Figure 1:
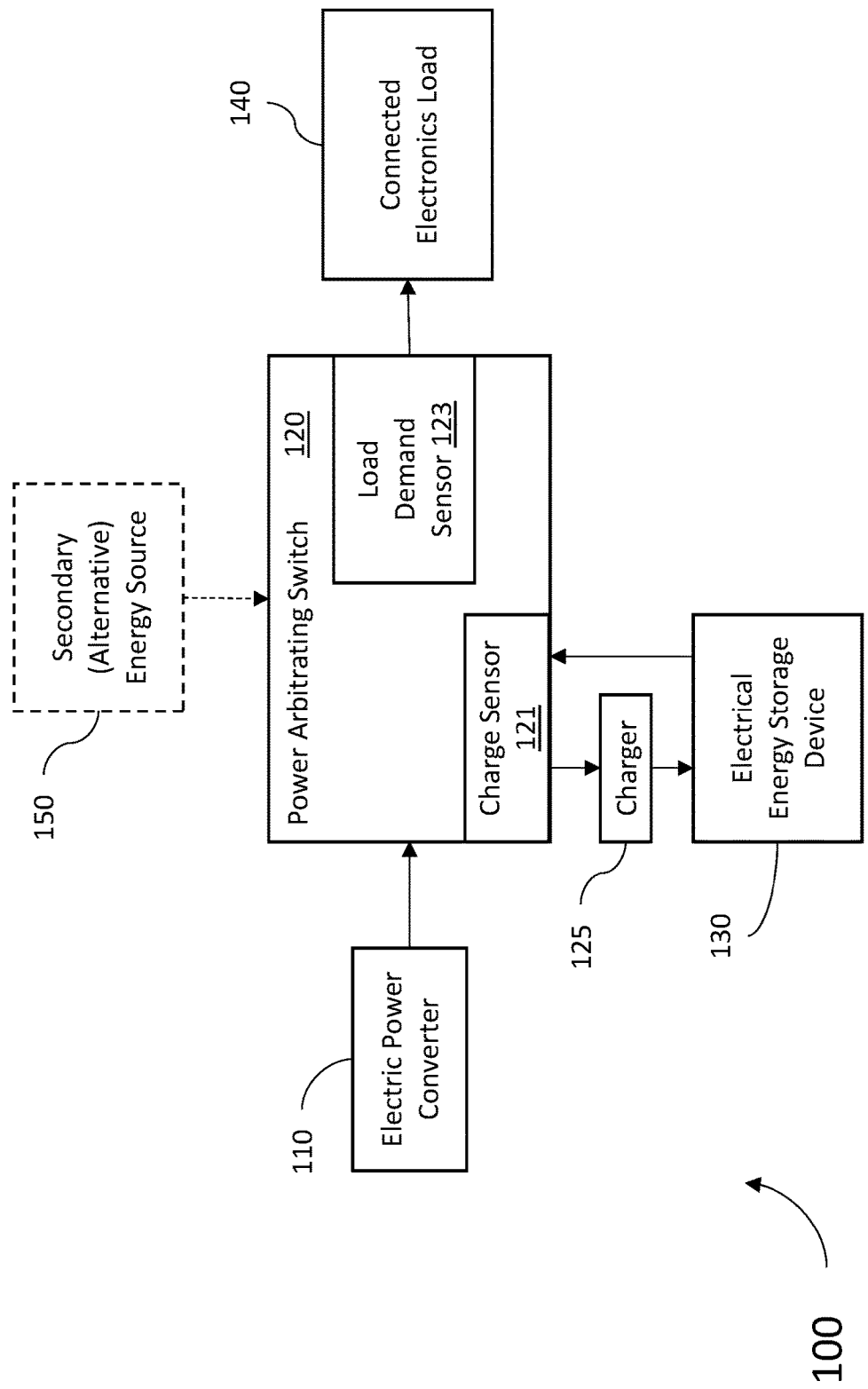
FIG. 1 is a block diagram illustrating a power supply system of one embodiment of the present disclosure.

FIG. 1 is a diagram illustrating a power supply system 100 of one embodiment of the present disclosure. Power supply system 100 includes an electric power converter 110, a power arbitrating switch 120, and an electrical energy storage device 130. As shown in FIG. 1, a connected electronics load 140 is coupled to the power supply system 100 and draws power from the power arbitrating switch 120. In one embodiment the power supply system 100 and connect electronics load 140 are integrated components within an overall electronics device. In other embodiments the power supply system 100 is a distinct component from the connected electronics load 140. Moreover, in some embodiments, the electric power converter 110 may be a discrete component, and the power arbitrating switch 120 is a separate discrete component coupled onto an output of the electric power converter 110 and intervening between the electric power converter 110 and the connected electronics load 140.

In alternate embodiments, the electric power converter 110 may comprise for example, a rectifier, a DC-to-DC converter, an AC-to-DC converter, an AC-to-AC converter, or other power supply device. In one embodiment, the electric power converter 110 is sized so that the average expected power demand from the connected electronics load 140 is less than the maximum power rating of the electric power converter 110. As mentioned above, power arbitrating switch 120 ensures that when the electric power converter 110 is operating, it is doing so at near peak capacity by using any marginal capacity not drawn by the connected electronics load 140 is used for charging the electrical energy storage device 130. That being said, there are several considerations in determining what maximum power rating is optimal for a specific implementation of power supply system 100 based on the peak-to-average power demand ratio associated with the connected electronics load 140. For example, system 100 may be designed with a smaller electric power converter 110 so that the electric power converter 110 may run more efficiently more of the time simply based on the power draw of the connected electronics load 140. Alternatively, a larger electric power converter 110 for the same given connected electronics load 140 would not run as efficiently, and the power arbitrating switch 120 would need to draw more power from the electric power converter 110 more of the time for charging the electrical energy storage device 130 to keep electric power converter 110 operating at near its maximum capacity. However, in this configuration, electric power converter 110 would be more capable of supplying momentary demand spikes from the connected electronics load 140 without drawing down as much of the charge of the electrical energy storage device 130.

As shown in FIG. 1, in one embodiment when the power arbitrating switch 120 draws power to charge the electrical energy storage device 130, it powers a charger 125 which in turn applies an appropriate charging voltage and current to the electrical energy storage device 130. In other embodiments, the charger 125 may be implemented with a charging circuit integrated within the power arbitrating switch 120. It should also be understood that although the power arbitrating switch 120 is referred to as a "switch", that nomenclature does not imply that the power arbitrating switch 120 is limited to a device that mechanically switches circuits such as by using relays. Instead, power arbitrating switch 120 may be implemented using any technology know to those of skill in the art for controlling electrical power flows including active or passive circuits, and/or solid state switching electronics.

In one embodiment, in order to arbitrate between powering the connected electronics load 140 via the electric power converter 110 versus the electrical energy storage device 130, power arbitrating switch 120 determines the immediate load demand from the connected electronics load 140 and whether the electrical energy storage device 130 is sufficiently charged to supply that demand, and further incorporates pre-programed knowledge of what power draw from the electric power converter 110 causes the electric power converter 110 to operate at a target peak efficiency. That is, the target peak efficiency is a selected design parameter that approximates the theoretical peak efficiency of the electric power converter. In other words, when the electric power converter 110 is loaded to operate at the target peak efficiency, it is effectively operating at near peak efficiency if not at peak efficiency. As such, the power arbitrating switch 120 can determine when the electric power converter 110 is running at near full load (and therefore at near peak efficiency) or at something less than full load. In one embodiment, the power arbitrating switch 120 includes a sensor 123 that measures the power demand placed on the switch by the connected electronics load 140. In some embodiments, the available charge of the electrical energy storage device 130 can be estimated by the power arbitrating switch 120 using another sensor 121. In some embodiments, the available charge of the electrical energy storage device 130 is determined as a function of its voltage level since energy storage device typically will drop as the stored energy is depleted. The power arbitrating switch 120 can then, based on the estimated charge, determine whether the electrical energy storage device 130 has sufficient stored energy to provide for the immediate power demand of the connected electronics load 140. In some embodiments, the decision of whether the electrical energy storage device 130 is sufficiently charged may be based purely on whether its current charge exceeds a predetermined threshold. It should be appreciated that the electrical energy storage device 130 may be implemented in alternated embodiments using various electrical energy storage technologies such as, but not limited to electrochemical devices (i.e., batteries), capacitive storage devices, or other means. For example, for a system 100 where the connected electronic load exhibits high peak-to-average power demand ratios, the electrical energy storage device 130 may be implemented using an ultra-capacitor that may have a relatively small storage capacity with respect to average power, but can provide significant momentary power to meet a peak demand.

Figure 2:
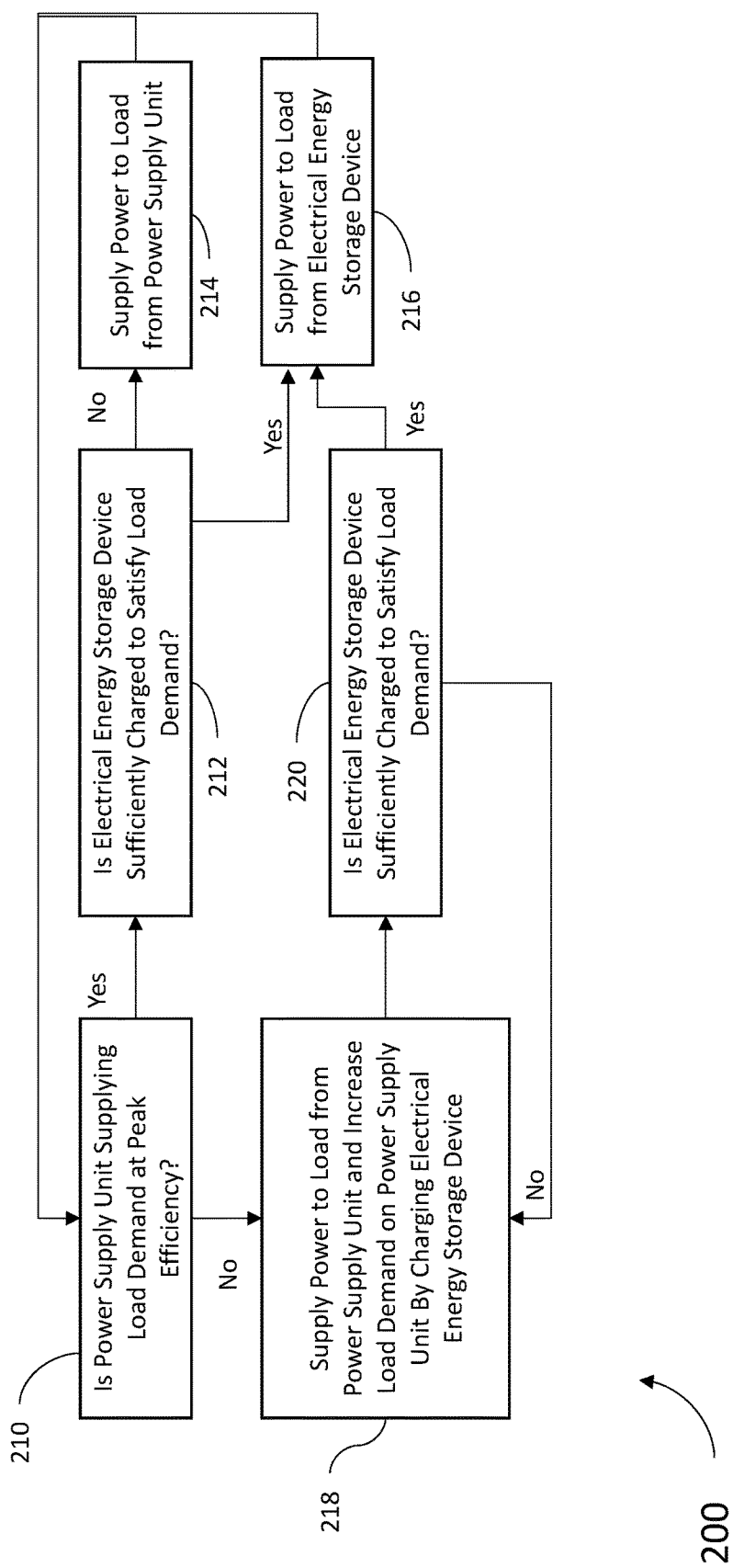
FIG. 2 is a flow chart illustrating a method of one embodiment of the present disclosure.

FIG. 2 is a flow chart illustrating one method 200 of the present disclosure which may be implemented by the power arbitrating switch 120 discussed in FIG. 1. The method begins at 210 with determining if the electric power converter is supplying a load demand (e.g., from a connected electrical load) at the target peak efficiency. If yes, the method 200 further considers at 212 whether the electrical energy storage device is sufficiently charged to satisfy that load demand. If not, then the load is powered by the electric power converter as shown at 214. If the electrical energy storage device is sufficiently charged to satisfy that load demand, then the method 200 proceeds to 216 to supply power to the load using energy already stored in the electrical energy storage device rather than drawing from the electric power converter. If the electric power converter is not supplying the load demand at the target peak efficiency, then the method proceeds from 210 to 218 where the load is supplied power by the electric power converter, and the extra capacity of the electric power converter is used to charge the electrical energy storage device. By doing so, the electric power converter at 218 will be operating at near peak efficiency, supplying the necessary power to the connected electrical load, and charging the electrical energy storage device. If at this point the electrical energy storage device is or becomes sufficiently charged to satisfy the load demand (checked at 220), then the method will proceed to 220 where the power arbitrating switch will supply power to the load from the electrical energy storage device. Otherwise, if the electrical energy storage device is not sufficiently charged to satisfy the load demand, the method remains at 218 where the electric power converter continues to simultaneously charge the electrical energy storage device while supplying power to the load. In some implementations where the electrical energy storage device is typically maintained in a sufficiently charged state, the power arbitrating switch 120 may supply the connected electrical load from the electrical energy storage device in order to ride-out momentary power interruptions in the power supplied to the electric power converter.

Figure 3:
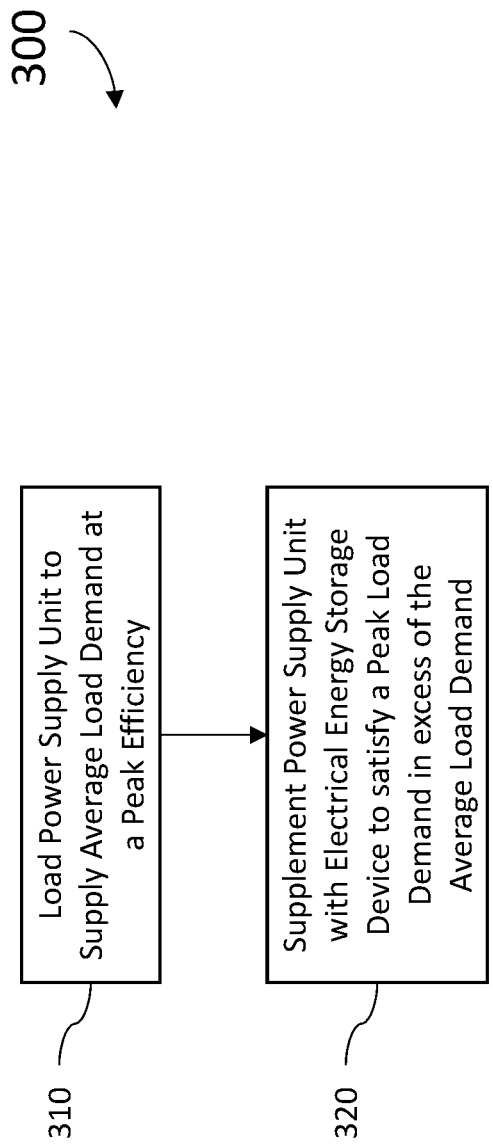
FIG. 3 is a flow chart illustrating a method of one embodiment of the present disclosure.

In still other embodiments, such as illustrated by the method 300 shown in FIG. 3, the power arbitrating switch 120 may further utilize power from the electric power converter and the electrical energy storage device simultaneously. For example, beginning at 310 when the electric power converter is already operating at peak efficiency there may be an additional momentary power draw from the connected electrical load. In that case, the power arbitrating switch 120, as shown at 320, may supplement the power from the electric power converter by further drawing power from the electrical energy storage device in order to meet the momentary increased demand.

Referring back to FIG. 1, as illustrated at 150, in some embodiments an optional secondary, or alternative, energy source may further be coupled to the power arbitrating switch 120. In such an embodiment, either any excess power capacity available from the electric power converter 110 or energy supplied by the alternative energy source 120 may be utilized for charging the electrical energy storage device 130. Furthermore, in some embodiments the alternative energy source 150 may be selected by the power arbitrating switch 120 as the primary provider of power to the connected electronics load 140 when the electric power converter 110 is not switched in to power the connected electronics load 140. In that case, the electrical energy storage device 130 can supplement power from the alternative energy source 150 when the alternative energy source 150 cannot fully supply power to the connected electronics load 140, and optionally sink power to be charged from the alternative energy source 150 when the alternative energy source 150 can produce more power than necessary to power the connected electronic load 140. As the term is used herein, an alternative energy source may include, but is not limited to renewable energy technologies such as photovoltaic cells, electricity generating wind turbines, geothermal heat, electricity generated by ocean waves, currents or changing tides.

Figure 4:
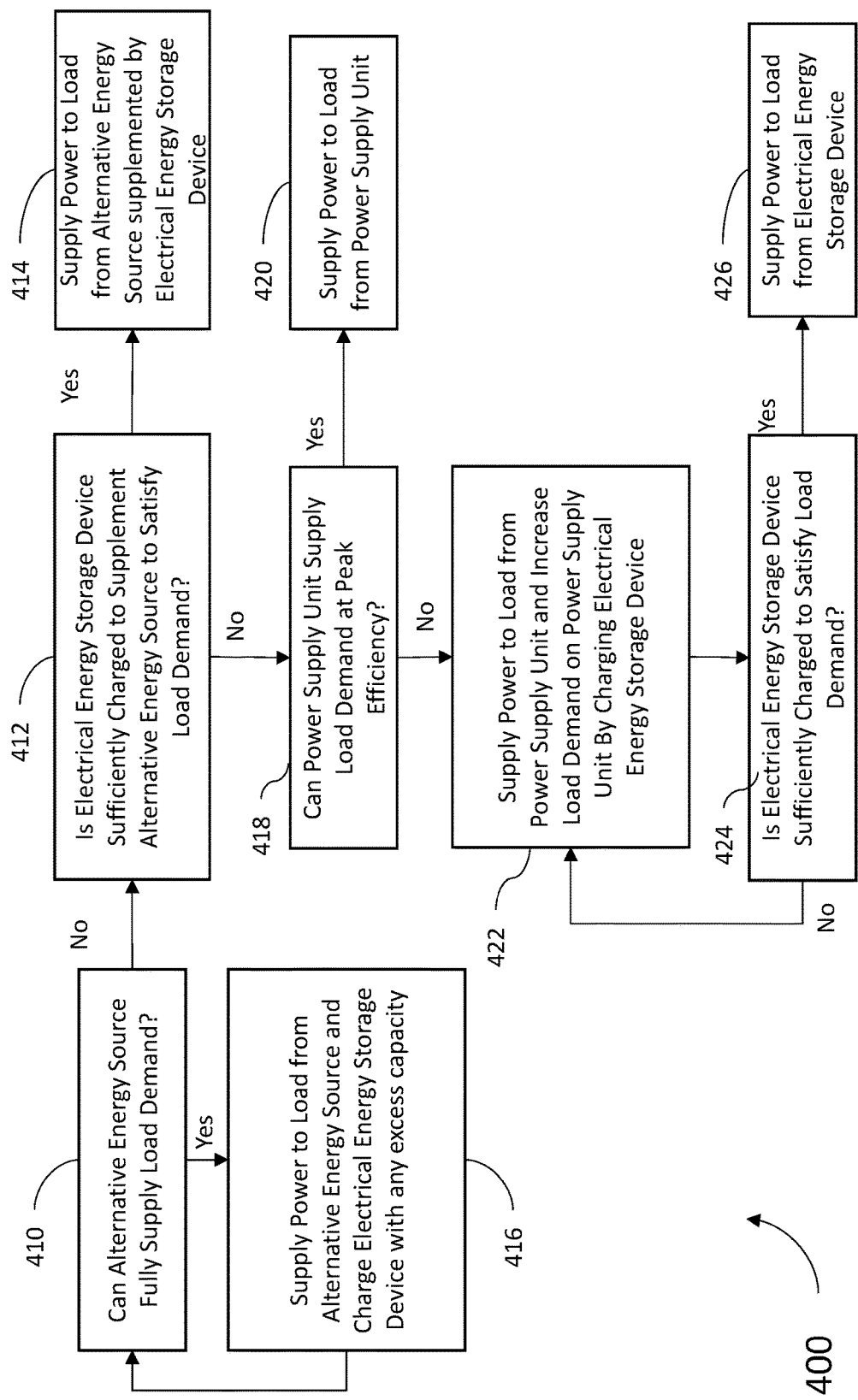
FIG. 4 is a flow chart illustrating a method of one embodiment of the present disclosure.

FIG. 4 is a flow chart illustrating one method 400 of the present disclosure which may be implemented by the power arbitrating switch 120 discussed in FIG. 1 when an alternative energy source 150 is available and coupled to the power arbitrating switch 120. The method 400 begins at 410 with determining whether the alternative energy source can fully supply the load demand to the connected electronics load. In one embodiment, the alternative energy source's ability to supply the load demand (i.e., the power delivery capacity of the alternative energy source) may be determined based on its ability to maintain a minimum voltage level when under load. If so, the method moves to 416 where the power to the load is supplied from the alternative energy source, and any excess capacity from the alternative energy source may be used to charge the electrical energy storage device. When the alternative energy source cannot fully supply the load demand to the connected electronics load, the method proceed to 412 with determining whether the electrical energy storage device is sufficiently charged to supplement the alternative energy source to satisfy the load demand from the connected electronics load. If so, the method proceeds to 414 with supplying power to the load from the alternative energy source supplemented by the electrical energy storage device. When the electrical energy storage device is not sufficiently charged to supplement the alternative energy source, the method proceeds to 418 with determining whether the electric power converter can supply the load demand at a target peak efficiency. If so, the method proceeds to 420 with supplying the load from the electric power converter. If the electric power converter cannot supply the load demand while operating at the target peak efficiency, the method moves to 422 where power is supplied to the load by the electric power converter and the load demand on the electric power converter is increased by charging the electrical energy storage device. By doing so, the electric power converter at 422 will be operating at near peak efficiency, supplying the necessary power to the connected electrical load, and charging the electrical energy storage device. If at this point the electrical energy storage device is in fact sufficiently charged to satisfy the load demand (checked at 424), then the method will proceed to 426 where the power arbitrating switch will supply power to the load from the electrical energy storage device. Otherwise, if the electrical energy storage device is not sufficiently charged to satisfy the load demand, the method remains at 422 where the electric power converter continues to simultaneously charge the electrical energy storage device while supplying power to the load.

EXAMPLE EMBODIMENTS

Example 1 includes a high efficiency electric power converter circuit, the circuit comprising: an electric power converter that provides a first electric power output; an electrical energy storage device that provides a second electric power output; and a power arbitrating switch that receives the first electric power output and the second electric power output and selectively supplies a third electric power output using at least one of the first electric power output and the second electric power output; wherein the power arbitrating switch is configured with a first sensor to measure a charge level of the electric energy storage device; wherein the power arbitrating switch is configured with a second sensor to measure a power demand drawn from the third electric power output; and wherein the power arbitrating switch switches the third electric power output between being supplied from the first electric power output and being supplied from the second electric power output based on the power demand and the charge level.

Example 2 includes the circuit of Example 1, wherein the power arbitrating switch is configured with a power setting corresponding to a target peak efficiency of the electric power converter; wherein when the power arbitrating switch determines that the electrical energy storage device is not sufficiently charged to meet the power draw: the power arbitrating switch feeds the third electric power output from the first electric power output; and the power arbitrating switch further loads the electric power converter to the target peak efficiency by charging the electrical energy storage device using at least part of the first electric power output.

Example 3 includes the circuit of any of Examples 1-2, wherein the power arbitrating switch feeds the third electric power output from the second electric power output when the power arbitrating switch determines that the electrical energy storage device is sufficiently charged to meet the power draw.

Example 4 includes the circuit of any of Examples 1-3, wherein the power arbitrating switch supplies the third electric power output from the first power output and the second electric power output when the power demand exceeds an average load demand rating of the electric power converter.

Example 5 includes the circuit of any of Examples 1-4, wherein the electric power converter comprises at least one of: a DC-to-DC converter; an AC-to-DC converter; an AC-to-AC converter; or an electric power rectifier.

Example 6 includes the circuit of any of Examples 1-5, further comprising: at least one connected electronics load electrically coupled to the power arbitrating switch, wherein the at least one connected electronics load draws the third electric power output from the power arbitrating switch; wherein the electric power converter has an undersized peak power supply rating with respect to a peak power demand of the at least one connected electronics load.

Example 7 includes the circuit of any of Examples 1-6, wherein the electrical energy storage device comprises one or more of: an electrochemical electric charge storage device; or a capacitive electric charge storage device.

Example 8 includes the circuit of any of Examples 1-7, further comprising: a secondary electrical energy source coupled to the power arbitrating switch, wherein the secondary electrical energy source provides a fourth electric power output to the power arbitrating switch; wherein the power arbitrating switch switches supplying the third electric power output from between the first electric power output, the second electric power output, and the fourth electric energy power output, based on the power demand, the charge level, and a power delivery capacity of the secondary electrical energy source Example 9 includes the circuit of Example 8, wherein the secondary electrical energy source provides electric energy generated using a renewable energy technology comprising at least one of: a photovoltaic cell; a wind turbine; geothermal heat conversion; or electricity generated from a force provided by ocean waves, currents or changing tides.

Example 10 includes the circuit of any of Examples 1-9, further comprising: a charging circuit coupled to the electrical energy storage device and powered from the power arbitrating switch; wherein the power arbitrating switch enables the charging circuit when the power demand is less than a target power demand associated with a target peak efficiency of the electric power converter.

Example 11 includes a high efficiency electric power arbitrating switch, the switch comprising: a first port configured to couple to an electric power converter, wherein the first port received a first electric power output from the electric power converter; a second port configured to couple to an electrical energy storage device, wherein the second port receives a second electric power output from the electrical energy storage device; a third port configured to provide a third electric power output from the switch; a first sensor that measure a charge level of the electric energy storage device; and a second sensor that measure a power demand drawn from the third port; wherein the power arbitrating switch switches the third electric power output between being supplied by the first electric power output and being supplied by the second electric power output based on the power demand and the charge level.

Example 12 includes the switch of Example 11, wherein the power arbitrating switch further comprises a power setting corresponding to a target peak efficiency of the electric power converter; wherein when the power arbitrating switch determines that the electrical energy storage device is not sufficiently charged to meet the power draw: the power arbitrating switch feeds the third electric power output from the first electric power output; and the power arbitrating switch further loads the electric power converter to the target peak efficiency by charging the electrical energy storage device using at least part of the first electric power output.

Example 13 includes the switch of any of Examples 11-12, wherein the power arbitrating switch feeds the third electric power output from the second electric power output when the power arbitrating switch determines that the electrical energy storage device is sufficiently charged to meet the power draw.

Example 14 includes the switch of any of Examples 11-13, wherein the electrical energy storage device is integral to the switch.

Example 15 includes the switch of any of Examples 11-14, further comprising: a charging circuit coupled to the electrical energy storage device; wherein the power arbitrating switch enables the charging circuit when the power demand is less than a target power demand associated with a target peak efficiency of the electric power converter.

Example 16 includes the switch of any of Examples 11-15, wherein the power arbitrating switch supplies the third electric power output from the first power output and the second electric power output when the power demand exceeds an average load demand rating of the electric power converter.

Example 17 includes the switch of any of Examples 11-16, further comprising: a fourth port configured to couple to a secondary electrical energy source, wherein the secondary electrical energy source provides a fourth electric power output to the power arbitrating switch; wherein the power arbitrating switch switches supplying the third electric power output from between the first electric power output, the second electric power output, and the fourth electric energy power output, based on the power demand, the charge level, and a power delivery capacity of the secondary electrical energy source Example 18 includes a method for operating a high efficiency electric power converter circuit using a power arbitrating switch, the method comprising: determining when an electric power converter is supplying electric power to a load at a target peak efficiency; determining when an electric power storage device has a sufficient charge to meet a power demand from the load; when the electric power converter is supplying electric power to the load at less than the target peak efficiency, operating the power arbitrating switch to charge the electric storage device with power from the electric power converter; and when the electric power storage device has a sufficient charge to meet the power demand from the load, operating the power arbitrating switch to switch from the electric power converter to supply electric power to the load with power from the electric power storage device.

Example 19 includes the method of Example 18, wherein when the power demand exceeds an average load demand rating of the electric power converter, operating the power arbitrating switch to supply electric power to the load with power from the electric power converter and the electric storage device.

Example 20 includes the method of any of Examples 18-19, further comprising: determining when a power delivery capacity of a secondary electric power source at least meets the power demand from the load; and when the power delivery capacity at least meets the power demand from the load, operating the power arbitrating switch to switch from either the electric power converter or the electric power storage device to supply electric power to the load with power from the secondary electric power source.

In various alternative embodiments, system and/or device elements, method steps, or example implementations described throughout this disclosure (such as the power arbitrating switch or sub-parts thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for controlling a supply of electrical power to a connected load, the method comprising:
   with a load demand sensor, measuring a demand for power placed on an output port of a device by a connected load, wherein the power is supplied by an electric power converter coupled to the device, and wherein the device is configured to charge an electric energy storage device using power from the electric power converter;
   selectively supplementing power supplied by the electric power converter to the connected load with power from the electric energy storage device in response to an increase in the power drawn by the connected load as measured by the load demand sensor.

2. The method of claim 1, further comprising:
   determining an efficiency of the power delivered from the electric power converter as a function of the demand for power by the connected load, wherein power supplied by the electric power converter is supplemented with power from the electric energy storage device based on the determined efficiency.

3. The method of claim 1, wherein the device is configured to charge the electric energy storage device using power from the electric power converter not drawn by the connected load.

4. The method of claim 1, wherein the device comprises:
   a first port configured to couple to the electric power converter;
   a second port configured to couple to the electrical energy storage device; and
   a third port configured to provide an electric power output from the device.

5. The method of claim 1, further comprising:
   determining when the electric power converter is supplying electric power to the load at a target peak efficiency.

6. The method of claim 1, wherein the electric power converter comprises at least one of:
   a DC-to-DC converter;
   an AC-to-DC converter;
   an AC-to-AC converter; or
   an electric power rectifier.

7. The method of claim 1, wherein the electrical energy storage device comprises one or more of:
   an electrochemical electric charge storage device; or
   a capacitive electric charge storage device.

8. A high efficiency electric power arbitrating device, the device comprising:
   a first load demand sensor configured to measure a demand for power placed on an output port of a device by a connected load, wherein the power is supplied by an electric power converter coupled to the device, and wherein the device is configured to charge an electric energy storage device using power from the electric power converter not drawn by the connected load;
   wherein the device is configured to selectively supplement power supplied by the electric power converter to the connected load with power from the electric energy storage device in response to an increase in the power drawn by the connected load as measured by the first load demand sensor.

9. The device of claim 8, wherein the device is configured to determining an efficiency of the power delivered from the electric power converter as a function of the demand for power by the connected load, wherein power supplied by the electric power converter is selectively supplemented with power from the electric energy storage device based on the determined efficiency.

10. The device of claim 8, wherein the device is configured to determining when the electric power converter is supplying electric power to the load at a target peak efficiency.

11. The device of claim 8, wherein the device is configured to charge the electric energy storage device using power from the electric power converter not drawn by the connected load.

12. The device of claim 8, wherein the device comprises:
   a first port configured to couple to the electric power converter;
   a second port configured to couple to the electrical energy storage device; and
   a third port configured to provide an electric power output from the device.

13. The device of claim 8, wherein the electric power converter comprises at least one of:
   a DC-to-DC converter;
   an AC-to-DC converter;
   an AC-to-AC converter; or
   an electric power rectifier.

14. The device of claim 8, wherein the electrical energy storage device comprises one or more of:
   an electrochemical electric charge storage device; or
   a capacitive electric charge storage device.

* * * * *